Figure 1:
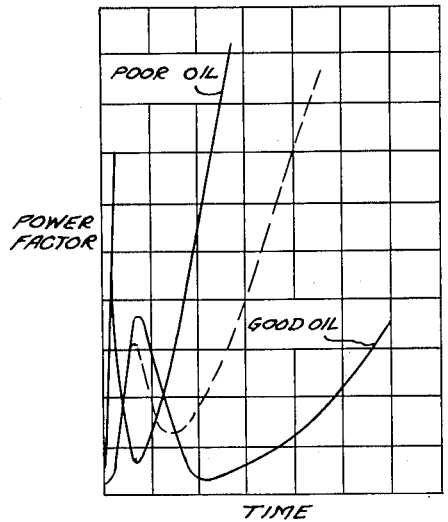

May 29, 1962 F. C. DOBLE ET AL 3,037,164
INSULATING OIL TESTING APPARATUS
Filed Sept. 25, 1959 2 Sheets-Sheet 1

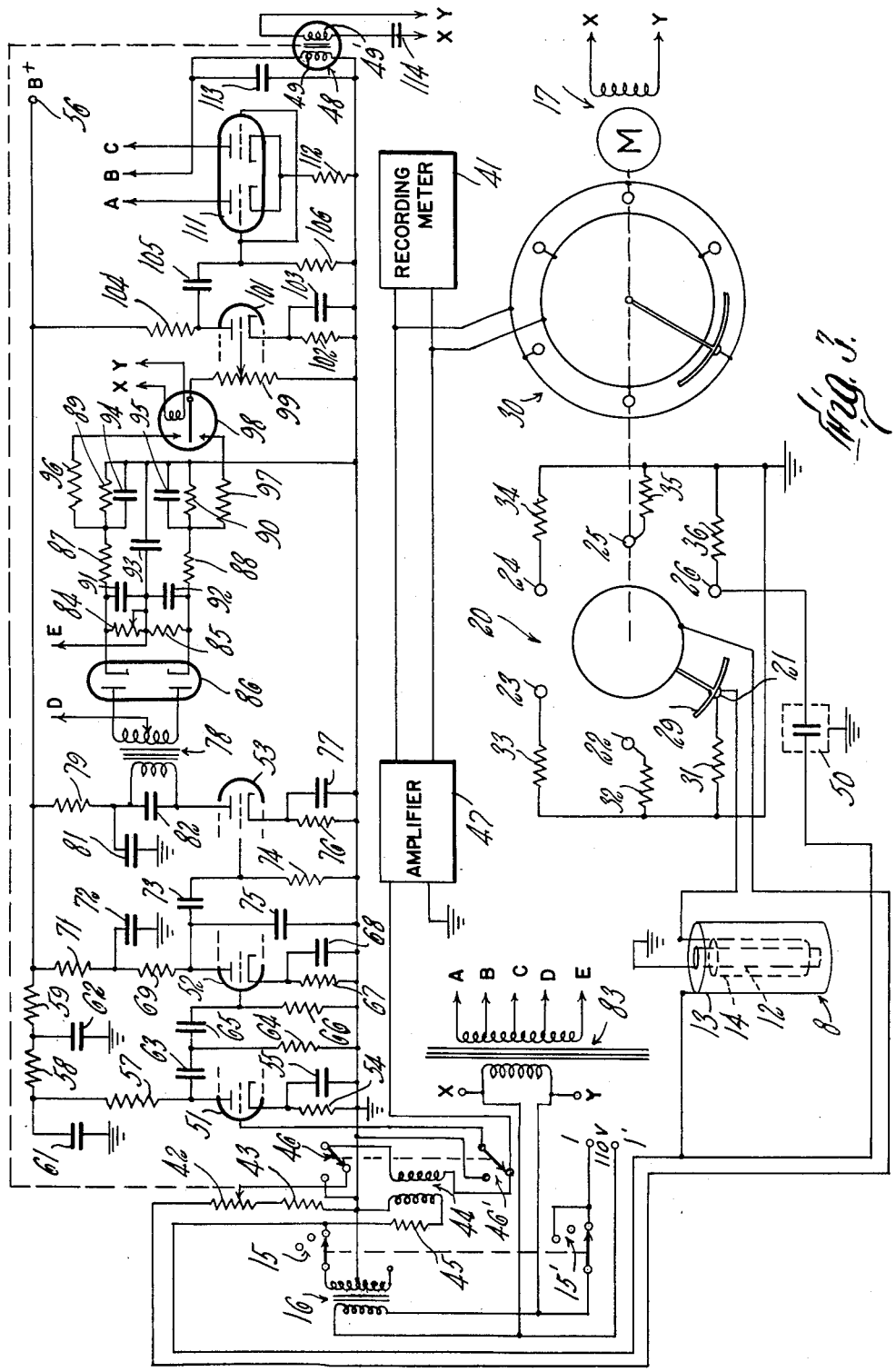

United States Patent Office 3,037,164
Patented May 29, 1962

3,037,164
INSULATING OIL TESTING APPARATUS
Frank C. Doble, Belmont, and Frederick S. Oliver, Reading, Mass., assignors to Doble Engineering Company, Belmont, Mass., a corporation of Massachusetts
Filed Sept. 25, 1959, Ser. No. 842,497
10 Claims. (Cl. 324—54)

This invention relates to accelerated oxidation testing of insulating oil and, more particularly, it is concerned with measurements indicative of an A.-C. loss characteristic of the oil during the course of an accelerated-oxidation test.

A disadvantage of oil as an insulator is that it deteriorates in use so that after a time it must be replaced in order to minimize the risk of an electrical failure. This is especially important in power systems where insulating oils are used in such devices as transformers, capacitors, cables, and switch gear, and where a single failure may result in a substantial interruption of service. The problem is how to determine the point at which an insulating oil is no longer safe to use. Heretofore changes in the A.-C. loss characteristics of an oil have been found to provide a good indication of its electrical state provided that A.-C. loss characteristics measurements are made often enough to define the changes accurately.

According to the present invention, it is proposed to provide novel methods and apparatus capable of performing accelerated life tests on insulating oil samples, and thereby determine in advance an oil's A.-C. loss characteristics over its useful life. Thus, these tests provide valuable information as to the relative merits of different kinds of oils as useful insulators in advance and without risking damage to expensive power equipment, as well as permitting the selection of an oil having preferred characteristics for a specified service. These novel results are accomplished in the present invention by accelerating the deterioration of insulating oil samples by continuously passing air through them in the presence of a metallic catalyst such as copper or iron or both, and then periodically measuring the A.-C. loss characteristics of the oil at the same time and in the same cell wherein the oil is undergoing continuous oxidation. This novel technique permits a high degree of control as contrasted with conventional techniques where samples must be removed for test, and thus only occasional tests are made which are subject to the errors attendant on any sampling method.

In order most effectively to carry out the methods of the invention, there is also provided novel apparatus including a novel test cell especially adapted for simultaneous electrical measurement and oxidation, as well as novel apparatus for connection thereto for measuring the A.-C. loss characteristics of oil in the test cell at recurrent intervals to establish its A.-C. loss characteristics throughout its useful life, usually until a precipitate or sludge first appears.

It is an especially important object of the present invention to provide highly precise apparatus of this character.

It is another object of the invention to automate the functions of the apparatus.

It is still another object of the invention to adapt the apparatus to the testing of relatively large numbers of oil samples simultaneously.

It is a further object of the invention to provide apparatus of this character that is capable of testing a group of oil samples in a minimum of time and with a high degree of reliability.

The novel features of the invention together with further objects and advatages thereof will become apparent from the following detailed description of preferred embodiments thereof and from the drawings to which it refers.

Figure 2:
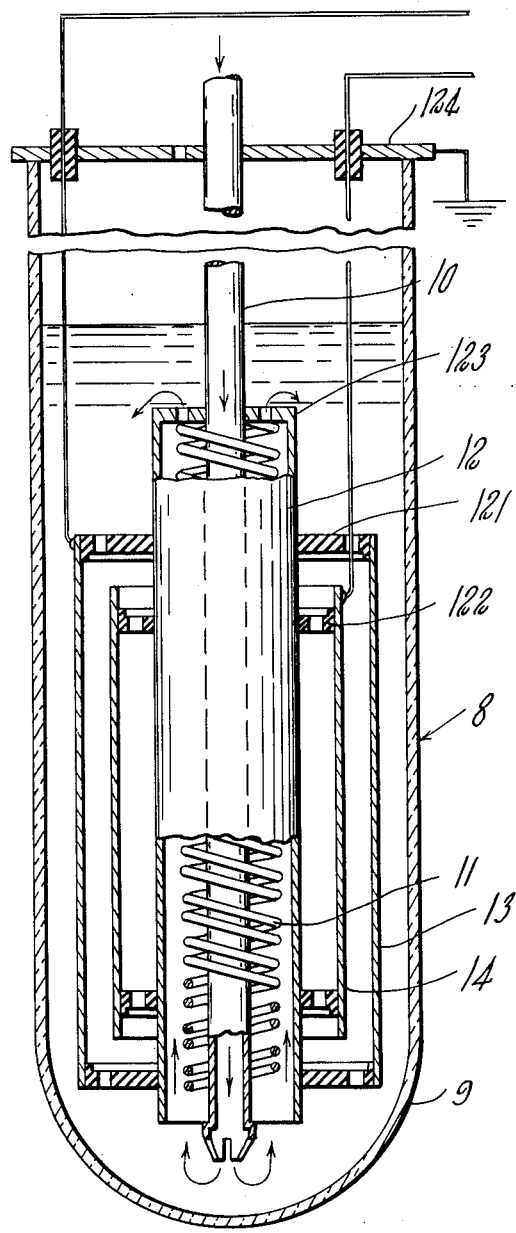

In the drawings:
FIG. 1 is a graph showing A.-C. loss characteristics-time curves of various oils while undergoing continuous oxidation according to the present invention;
FIG. 2 is a sectional view of a novel continuous oxidation test cell according to the present invention;
FIG. 3 is a schematic diagram of a complete apparatus for automatically producing A.-C. loss characteristics-time curves in accordance with the present invention.

Referring to the drawings, in FIG. 1 is shown a number of typical A.-C. loss characteristics-time curves of oils measured by the methods of the present invention utilizing, say, a test cell such as is shown in FIG. 2. Such test cell, generally designated 8, will be hereinafter more fully described, but generally includes a central downwardly extending air tube 10, a surrounding coil 11, or coils, usually of copper or iron or both, an inner electrode 12, outer electrode 13 and middle electrode 14, these elements being immersed in the oil to be tested contained within a suitable surrounding jar 9.

In accordance with the methods of the invention for evaluating oil in terms of an A.-C. loss characteristics-time tests, the body of oil to be measured is maintained in jar 9 with its level above the tops of the electrodes 12, 13 and 14 as is shown in FIG. 2, and may be heated if desired to achieve a uniform temperature, 95° C. being common. A continuous stream of an oxygen-containing gas, usually air, is continuously passed from a suitable source, not shown, through central tube 10 and emerges from said tube through an accurately dimensioned jet in small bubbles or other finely divided form for free flow upwardly through the body of the oil in the catalyst-containing volume between the tube 10 and inner electrode 12. The rate of flow is kept uniform by maintaining the same pressure on each accurately dimensioned jet and, therefore, each and every tube is exposed to the same rate of air flow. The upward movement of the bubbles also causes a flow of oil as is shown by the arrows in FIG. 2 around the top of the inner electrode and downwardly between the intermediate electrode and both the inner and outer electrodes. Thus, the electrical measuring element, basically the middle and outer electrodes, since the inner electrode is electrically guard-grounded, is remote from the upwardly flowing bubbles, any electrical measurements taken between the intermediate electrode and the outer electrode are not affected by the continuous flow of gas upwardly through the cell, even though they are continuously washed by oil flowing from the oxidation region of the cell to the remote electrical measuring region thereof and downwardly past the middle and outer electrodes. Under these conditions, it is possible to measure an electrical loss characteristic of the oil, such as its dissipation factor, as will be hereinafter more fully explained, simultaneously with continuous oxidation of the oil in the same cell.

In order to carry out the above described method with the greatest facility, the present invention also provides novel apparatus best shown in FIG. 3, such apparatus including a test cell as is described above.

Connected to the outer electrode 13 is one of the stationary contacts of a three-position switch 15 whose movable contact is connected to one end of the secondary winding on a transformer 16. Transformer 16 has a center tap connected to a common point or ground and its primary winding is adapted to be selectively energized by an alternating current applied to terminals 1—1'. Thus, one end of the primary winding is connected directly to the terminal 1' and the other end of the winding is connected to the movable contact of a three-position switch 15', two of whose stationary contacts are connected to terminal 1. Switch 15' and switch 15 are ganged to permit a selection of their positions to be made in one manual operation.

Connected to the intermediate electrode 14 of the cell 11 is one of the stationary contacts 21 of a six-position cell selector switch 20 which is continuously driven by a motor 17. Motor 17 is energized by the same alternating current as is applied to the primary of the transformer 16 by way of the terminals designated X and Y. Selector switch 20 whose other stationary contacts have been designated 22–26 and whose rotary contact has been designated 29 is merely illustrative of a multi-position switch of like character, and the same is true of a shorting switch 30 which is also driven by the motor 17. Selector switch 20 serves to connect in circuit successive ones of a group of cells (not shown) like cell 8 so that their condition can be recorded on a meter 41, and shorting switch 30 serves to blank the meter during the intervals that the movable contact of switch 20 is between the stationary contacts 21–26. There are also provided between the switch contacts 21–26 and ground, resistors 31–36 of relatively low value with respect to the cell impedances, in order to limit the voltages appearing on the unmade contacts of the switch.

To obtain an indication of the A.-C. loss characteristics of the oil sample in cell 8 and other cells like it, the rotary contact 29 of the selector switch 20 is connected to one end of a potentiometer 42 and the other end of the potentiometer is connected to ground through a resistor 43. The combined resistance of the potentiometer 42 and the resistor 43 is small in comparison with the impedance of the cell 8, thereby to produce a voltage between the movable arm of the potentiometer and ground which accurately reflects the phase of the current passing through the cell. This voltage is adapted to be combined with a reference voltage developed by the secondary winding of a mutual inductor 44 whose primary winding is disposed in series with a resistor 45 of relatively high value between the outer cell electrode 13 and ground.

Thus, the movable arm of the potentiometer is connected to one of the stationary contacts of a two-position switch 46 and one end of the secondary winding of the mutual inductor is connected to the corresponding contact of a two-position switch 46' which is ganged to switch 46. The other end of the mutual inductor secondary is connected to the movable contact of switch 46, so that the combined output voltage from the potentiometer 42 and the mutual inductor 44 is caused to appear between the movable contact of switch 46' and ground. This output voltage is amplified by an amplifier 47 and applied to the recording meter 41 which furnishes an indication thereof when not disabled by the shorting switch 30. The other stationary contacts of switches 46 and 46' permit the disabling of the potentiometer balancing amplifier and the connection of the input of amplifier 47 across the secondary of mutual inductor 44. In this latter position, the gain of amplifier 47 is adjusted to a reading of 100 on the recording meter. The voltage output of the amplifier 47 is adapted to provide a relative indication of the A.-C. loss characteristics of a cell when the potentiometer 42 is appropriately adjusted to provide an input voltage to the amplifier which is substantially in phase with the test voltage applied between the outer cell electrode 13 and ground. This adjustment of the potentiometer is made automatically by a servo motor 48 which drives the movable arm of the potentiometer and which has a control winding 49 that is made responsive to the amplifier input voltage in the following way. Connected to the same points as the input terminals to the amplifier 47 is a three-stage servo amplifier comprising triodes 51, 52 and 53. Triode 51 has its cathode connected to ground through a bias resistor 54 having a bypass capacitor 55 disposed across it, its anode connected to a source of B+ at a terminal 56 through resistors 57, 58 and 59, and its control electrode connected to the movable contact of switch 46'. A capacitor 61 is connected from the junction of resistors 57 and 58 to ground for filtering and for like purpose there is a capacitor 62 connected from the junction of resistors 58 and 59 to ground. Triode 51 is resistance-capacitance coupled to triode 52 by means of a two-section coupling network, the first section of which is formed with a coupling capacitor 63 and a resistor 64, and the second section of which is formed with a coupling capacitor 65 and a resistor 66. Triode 52 has its control electrode or grid connected to the junction of capacitor 65 and resistor 66, its cathode connected to ground through a bias resistor 67 with a bypass capacitor 68 across it, and its anode connected to B+ through resistors 69 and 71. A filter capacitor 72 is provided between the junction of these latter resistors and ground. Resistance-capacitance coupling is likewise used between triode 52 and triode 53, a coupling capacitor 73 being provided between the anode of triode 52 and the control electrode or grid of triode 53, a grid resistor 74 being provided between grid of triode 53 and ground, and a bypass capacitor 75 being provided in addition between the anode of triode 52 and ground. The cathode of triode 53 is connected to ground through a bias resistor 76 with a bypass capacitor 77 across it and the anode of triode 53 is connected to B+ through the primary of a transformer 78 and a resistor 79. A filter capacitor 81 connected between ground and the junction of the resistor 79 and the primary winding, together with a bypass capacitor 82 connected across the primary, complete the three-stage amplifier for the servo system.

By means of the phase shift characteristics of the interstage coupling networks, this amplifier is adapted to produce a net phase displacement of the input signal thereto that is substantially equal to 90°. The phase of the signal as thus shifted is compared in a phase discriminator with a voltage that is in phase with the test voltage between the outer cell electrode 13 and ground. This comparison or reference voltage is derived from the secondary winding D—E on a transformer 83 and it is applied between a center tap on the secondary of transformer 78 and the junction of a pair of load resistors 84 and 85 for the phase discriminator. The signal itself appears across the secondary of transformer 78 which is disposed in the input circuit to the phase discriminator.

More particularly, the phase discriminator is seen to include a double diode 86 whose anodes are connected to the ends of the secondary winding of transformer 78 and whose cathodes are connected to the remote ends of resistors 84 and 85. For trimming purposes, resistor 84 takes the form of a potentiometer having its movable arm connected to one of its ends. Also forming a part of the phase discriminator are resistors 87, 88, 89, 90 and capacitors 91, 92 and 93. Capacitors 91 and 92 are connected across the resistors 84 and 85, respectively, and capacitor 93 is connected from the common junction thereof to ground. One cathode of double diode 86 is connected to ground through the series combination of resistors 87, 89 and the other cathode is connected to ground through resistors 88 and 90. Capacitors 94 and 95 are disposed across the resistors 89 and 90 respectively.

The D.C. output voltage from the phase discriminator is derived from the junctions of resistors 87, 89 and 88, 90, and is applied through resistors 96 and 97 to the respective stationary contacts of a sixty-cycle circuit interrupter or chopper 98. Chopper 98 is powered from the common 110-volt source as aforementioned by way of terminals X—Y and has its movable contact connected to one end of a potentiometer 99 disposed in the input circuit of a single stage amplifier formed with a triode 101. Triode 101 has its control electrode connected to the movable arm of potentiometer 99, its cathode connected to ground through a bias resistor 102 with bypass capacitor 103 across it, and its anode connected to the source of B+ through a resistor 104. The output signal from triode 101 is applied to a differential control circuit for the motor winding 49. To this end, the triode and the control circuit are intercoupled by means of a capacitor 105 and a resistor 106 across which the output signal is developed.

The motor control circuit comprises a twin triode 111 having its control electrodes both connected to the resistor 106, its cathodes connected to ground through a common bias resistor 112, and its anodes connected to the respective ends of a secondary winding A—C on the transformer 83. This secondary winding has a center tap B to which one end of the motor control winding 49 is connected, the other end of the motor control winding being connected to ground. Motor 48 also has an auxiliary winding 49' connected to the common 110 volt alternating current source by way of terminals X—Y. To produce the necessary phase displacement of the currents in the motor windings there is provided a capacitor 113 in parallel with the winding 49 and a capacitor 114 in series with the winding 49'.

More specifically as to cell 8 already briefly described above, in FIGS. 2 and 3 there is shown a preferred construction for the cell 8 and others like it. Its three electrodes 12, 13 and 14 are seen to comprise hollow cylinders joined by spacer members 121, 122 in a coaxial array. Spacer members 121, 122 are made of a suitable insulating material such as styrene plastic whereas the electrodes themselves are of inert metal such as stainless steel or plated active metals such as brass so that they will be inert in the presence of oil although one or more of the electrodes may be copper and used to replace the separate catalyst coil. Also, it should be noted that the outer and middle electrodes 13 and 14 are each directly supported from the inner electrode 12 by their spacers 121 and 122 respectively. This is important in order to measure only the characteristics of the oil. The inner electrode 12 is supported on tube 10 by a metallic spacer 123 so that it is electrically connected to said tube for guard-grounding therethrough. The oil is held in a jar 9 of glass wherein the above described electrode assembly is suspended by means of a metallic top plate 124 and is submerged beneath the surface of the oil. In order to accelerate the process of deterioration that the oil normally undergoes in service, there is provided a catalyst 11 within the inner electrode which may be in the form of a coil 11 of copper or iron wire or both, and dry air is passed through it. The catalyst may conveniently take the form of a bifilar helix 11 of iron and copper which is retained on air tube 10. The tube 10 is supported coaxially within the electrode 12 by its spacer 123 and has its outlet end slightly above the lower end of jar 9. As a consequence, air bubbles pass up through the grounded inner electrode 12 where the turbulence created thereby has substantially no effect on the electrical measure of A.-C. loss characteristics conducted in a region remote therefrom in the dielectric space between electrodes 13 and 14. It has also been found desirable to elevate the temperature of the cell and others like it. This may be accomplished by the provision of a tank of hot liquid (not shown) in which the containers are immersed.

In operation, assuming all the switches to be positioned as shown, meter 41 will be effective to indicate the value of a voltage representing the resistive component of the cell current as soon as the servo-system becomes balanced. The reason is as follows. The signal voltage appearing at the input to the three-stage servo amplifier and the amplifier 47 is comprised of the vector difference between two voltages. One of these, the variable voltage from the potentiometer 42, is in phase with the cuurrent passing through the cell 8, and the other, the fixed reference voltage from the mutual inductor 44, is in phase quadrature with the test voltage between electrode 13 and ground. The test voltage is substantially the same as the voltage across the cell owing to the relatively low value of the resistances 42 and 43 as compared with the impedance of the cell, from which it follows that the reference voltage is likewise in phase quadrature with the cell voltage. Therefore, the reference voltage will be effective to cancel the reactive component of the variable voltage from the potentiometer 42 when the magnitude of the latter voltage has been appropriately adjusted by means of the motor 48. In this case, the vector difference or signal voltage will correspond to the remaining resistive component of the cell current which is in phase with the cell voltage and which provides an indication of how the A.-C. loss characteristics of the cell varies with time.

When the magnitude of the voltage developed by the cell current is such that a phase difference exists between the signal voltage and the cell voltage, the signal voltage which is rotated 90° by the servo amplifier will not arrive at the discriminator 90° out of phase with the voltage D—E, which has the same phase as the cell voltage. As a consequence, there will be developed by the discriminator and passed to the chopper 98 a direct voltage representing in magnitude and polarity the magnitude and sense of the deviation from a quadrature phase condition. The chopper 98 converts this direct voltage to a square wave, which either has approximately the same or opposite phase as the voltage A—C, depending upon the polarity of the direct voltage, the voltage A—C being obtained without appreciable phase shift from the same 110 volt source as is used to energize the chopper.

The square wave produced by the chopper is amplified by the triode 101 and is applied as a control voltage to both halves of twin triode 111. Each half of twin triode has the control winding 49 of the motor 48 in its load circuit and each has applied thereto as an anode voltage a portion of the voltage A—C. Specifically, the anode voltage of half the twin triode corresponds to the voltage A—B between the center tap B and the winding end A of the transformer 83, and the anode voltage of the other half of the twin triode corresponds to the voltage B—C between the center tap B and the winding end C. The control voltage is in phase with the voltage applied to one of the triode anodes and, thus, current will be caused to flow through the control winding 49 of the motor producing rotation thereof.

The direction of rotation of the motor is determined by the sense of the phase displacement between the control voltage and the anode voltages. With the control winding thus energized, the motor and hence the potentiometer will rotate in a direction which tends to correct the deviation from a quadrature phase condition at the discriminator. When the deviation has been wholly overcome, no output voltage will be produced by the discriminator and, hence, no control voltage will be present at twin triode 111. Since the twin triode is biased very nearly to cutoff, it will then be substantially non-conductive and insufficient driving current will be available to the motor to keep it in motion. In this way, a balance is automatically obtained and the indication of meter 41 caused to represent the resistive component of the cell current. Calibration of the meter can be checked by a standard capacitor 50 connected in place of a test cell.

Those skilled in the art will appreciate that the methods and apparatus described in detail herein by way of example can be modified in various ways without departing from the spirit and scope of the invention.

What is claimed is:

1. A method of evaluating electrical insulating oil of petroleum origin comprising a body of oil to be measured, continuously supplying beneath the surface of said body of oil an excess of a dry oxygen-containing gas in finely divided form for free flow upwardly past a catalyst through said body of oil to react with said oil to cause flow of oil within said body in the vicinity of an electrical measuring element beneath the surface of said oil and remote from the upwardly flowing gas and simultaneously measuring an electrical loss characteristic of said oil at a position beneath the surface of said oil remote from said upwardly flowing gas while said oil flows downwardly past said electrical measuring element.

2. A method of evaluating electrical insulating oil of petroleum origin comprising maintaining a body of oil to be measured, continuously supplying beneath the surface of said body of oil an excess of a gas in finely divided form for free flow upwardly through a confined portion of said body of oil to cause upward movement of said oil with said gas in said confined portion past a catalyst positioned within said confined portion to react said gas with said oil, said upward flow of oil in a path from the bottom of said confined portion providing a closed circulation of said oil within the body thereof and past the vicinity of an electrical measuring element beneath the surface of said oil and remote from said confined portion and simultaneously measuring an electrical loss characteristic of said oil at a position beneath the surface of said oil remote from said upwardly flowing gas while said oil flows downwardly past said electrical measuring element.

3. A method as claimed in claim 2 wherein said gas is dry.

4. A method as claimed in claim 3 wherein said gas contains oxygen.

5. A method of evaluating electrical insulating oil of petroleum origin comprising a body of oil to be measured, continuously supplying beneath the surface of said body of oil an excess of a dry, oxygen containing gas in finely divided form for free flow upwardly through a confined central portion of said body of oil to cause upward movement of said oil with said gas in said confined central portion past a catalyst positioned within said confined central portion to react said gas with said oil, said upward flow of oil within said body being diverted to cause downward flow of oil in an annular path surrounding said central portion toward the bottom of said confined portion and between electrical measuring elements surrounding said confined portion and maintained beneath the surface of said body of oil, providing a closed circulation of oil within said body upwardly through the central portion thereof and downwardly through said annular path between said electrical measuring elements, with said oil in said annular path being separated from said oil and said gas in said confined portion and simultaneously measuring an electrical loss characteristic of said oil between said electrical measuring elements at a position beneath the surface of said oil remote from said upwardly flowing gas while said oil flows downwardly past said electrical elements.

6. Apparatus for measuring the electrical loss characteristics of a dielectric medium, said apparatus comprising a source of alternating voltage to charge the dielectric medium, a variable impedance element disposed in the path of the charging current and the leakage current attendant thereto, means to provide a voltage in phase quadrature with the source voltage, a difference circuit to combine the quadrature voltage and the voltage across at least a part of said impedance element and to produce a difference signal representing the difference thereof, means to provide a reference signal in phase agreement with said source voltage, means to shift the phase of one of said difference and reference signals by approximately 90° connected to one of said difference circuit and said means to provide a reference signal, a phase discriminator circuit connected to said means to shift the phase of one of said difference and reference signals and connected to the other of said difference circuit and said means to provide a reference signal, said phase discriminator circuit being effective to combine said signals and to develop an error signal representing deviations from a quadrature phase relation thereof, means automatically to vary the impedance of said element in response to said error signal to establish a quadrature phase relation between said difference signal and said reference signal, and means to indicate the amplitude of said difference signal.

7. Apparatus according to claim 6 wherein said impedance element consists of a variable resistance device having a maximum resistance that is very much less than the impedance of said dielectric medium, and wherein said means to provide a quadrature voltage consists of a resistor and a mutual inductor having primary and secondary windings, said resistor being connected in series with the primary winding across the source of alternating voltage and having a relatively high resistance value as compared with the impedance of said primary winding.

8. Apparatus for measuring the electrical loss characteristics of dielectric mediums, said apparatus comprising a source of alternating voltage, a selector switch successively to charge individual dielectric mediums with said alternating voltage, a variable impedance element disposed in the path of the charging current and the leakage current attendant thereto, means to provide a voltage in phase quadrature with the source voltage, a difference circuit to combine the quadrature voltage and the voltage across at least a part of said impedance element and to produce a difference signal representing the difference thereof, means to provide a reference signal in phase agreement with said source voltage, means to shift the phase of one of said difference and reference signals by approximately 90° connected to one of said difference circuit and said means to provide a reference signal, a phase discriminator circuit connected to said means to shift the phase of one of said difference and reference signals and connected to the other of said difference circuit and said means to provide a reference signal, said phase discriminator circuit being effective to combine said signals and to develop an error signal representing deviations from a predetermined phase relation thereof, means automatically to vary the impedance of said element in response to said error signal to establish the predetermined phase relation between said difference signal and said reference signal, a recording meter connected to said difference circuit to indicate the amplitude of said difference signal, and a blanking switch to short-circuit said difference signal for a predetermined interval after a said medium becomes initially charged by said source voltage thereby to permit the predetermined relation of said difference signal and said reference signal to be established prior to recordation of the difference signal amplitude.

9. Apparatus according to claim 8 including a synchronous motor, said selector and blanking switches having rotary actions and being coaxially driven by said motor.

10. Apparatus for measuring the electrical loss characteristics of a dielectric medium, said apparatus comprising a source of alternating voltage to charge the dielectric medium, a variable impedance element disposed in the path of the charging current and the leakage current attendant thereto, means to provide a voltage in phase quadrature with said source voltage, a difference circuit to combine the quadrature voltage and the voltage across at least a part of said impedance element and to produce a difference signal representing the difference thereof, means to provide a reference signal in phase agreement with said source voltage, means to shift the phase of one of said difference and reference signals by approximately 90° connected to one of said difference circuit and said means to provide a reference signal, a phase discriminator circuit connected to said means to shift the phase of one of said difference and reference signals and connected to the other of said difference circuit and said means to provide a reference signal, said phase discriminator circuit being effective to combine said signals and to develop an error signal representing deviations from a predetermined phase relation thereof, a circuit interrupter to convert said error signal to an alternating voltage representing in phase the sense of the deviation and in amplitude the extent thereof, a differential motor control circuit responsive to the alternating voltage derived from said error signal to provide a driving current of corresponding amplitude and phase, a servo-motor energized by the driving current from said control circuit to vary the impedance of said element, and means to indicate the amplitude of said difference signal.

References Cited in the file of this patent

UNITED STATES PATENTS

| | | |
|---|---|---|
| 2,513,794 | Gambrill | July 14, 1950 |
| 2,535,027 | Anderson | Dec. 26, 1950 |
| 2,569,691 | Roberts | Oct. 2, 1951 |
| 2,578,499 | Bauer | Dec. 11, 1951 |
| 2,627,539 | Tompkins | Feb. 3, 1953 |
| 2,752,543 | Smith | June 26, 1956 |
| 2,754,457 | Meyers | July 10, 1956 |
| 2,923,879 | Povey | Feb. 2, 1960 |
| 2,968,180 | Schafer | Jan. 17, 1961 |

FOREIGN PATENTS

| | | |
|---|---|---|
| 941,082 | Germany | Apr. 5, 1956 |